US012769939B2

(12) United States Patent
Laban et al.

(10) Patent No.: US 12,769,939 B2
(45) Date of Patent: Oct. 20, 2026

(54) SYSTEMS AND METHODS FOR TRAINING AND EVALUATING LONG-CONTEXT NEURAL NETWORK BASED LANGUAGE MODELS

(71) Applicant: Salesforce, Inc., San Francisco, CA (US)

(72) Inventors: Philippe Laban, New York, NY (US); Alexander R. Fabbri, New York, NY (US); Caiming Xiong, Menlo Park, CA (US); Chien-Sheng (Jason) Wu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 148 days.

(21) Appl. No.: 18/930,701

(22) Filed: Oct. 29, 2024

(65) Prior Publication Data

US 2025/0384209 A1 Dec. 18, 2025

Related U.S. Application Data

(60) Provisional application No. 63/660,489, filed on Jun. 15, 2024.

(51) Int. Cl.
*G06F 40/20* (2020.01)
*G06F 16/34* (2025.01)

(52) U.S. Cl.
CPC ............ *G06F 40/20* (2020.01); *G06F 16/345* (2019.01)

(58) Field of Classification Search
CPC ............................... G06F 40/20; G06F 16/345
See application file for complete search history.

(56) References Cited

U.S. PATENT DOCUMENTS

| | | | | |
|---|---|---|---|---|
| 2018/0129634 | A1* | 5/2018 | Sivaji | G06F 40/258 |
| 2020/0125673 | A1* | 4/2020 | Aharonov | G06N 3/0895 |
| 2021/0150338 | A1* | 5/2021 | Semenov | G06F 18/23 |
| 2022/0318506 | A1* | 10/2022 | Wang | G06F 40/126 |
| 2025/0077558 | A1* | 3/2025 | Zhang | G06F 40/205 |

* cited by examiner

*Primary Examiner* — Darioush Agahi
(74) *Attorney, Agent, or Firm* — Haynes and Boone, LLP

(57) ABSTRACT

Embodiments described herein provide a method for configuring an artificial intelligence (AI) conversation bot to respond to a user query based on retrieved contextual documents. The method includes: receiving, via a communication interface, a user query comprising a natural language description of a topic; generating, by a first neural network based language model, one or more subtopics of the topic based on a first input prompt combining the topic and a first instruction to generate the one or more subtopics; generating, by the first neural network based language model, one or more statements for at least one of the subtopics based on a second input prompt combining the one or more subtopics and a second instruction to generate the one or more statements; and generating, by the first neural network based language model, at least one document containing a set of randomly selected statements from the one or more statements.

20 Claims, 12 Drawing Sheets

3 REFERENCE INSIGHTS

One student suggests taking a 5-minute break after every 25 minutes of studying, and mentions the *Pomodoro technique* as helpful.
*Reference Docs: 8, 32, 79, 83, 95*
Coverage: 100; Citation P:50; R: 20; F1: 29

A student recommends using a specific meditation app called 'Calm' that they use for 15 minutes each morning to manage stress.
*Reference Docs: 11, 30, 46, 53, 79, 80*
Coverage: 50; Citation P: 80; R: 67; F1: 73

One student shares that they do 10 minutes of *deep breathing* exercises each night before going to bed to help reduce stress.
*Reference Docs: 8, 32, 46, 53, 69, 91, 95*
Coverage: 0;

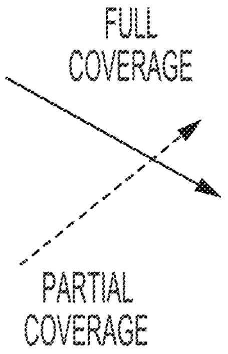

CANDIDATE SUMMARY

Here are the main insights regarding exam stress tips:

- Students shared various methods for handling stress, including the use of meditation apps such as 'Calm' to promote relaxation and focus *[79,11,46,53,54]*.
- The *25-5 minute Pomodoro Technique* was discussed for its structure and possible positive impact on productivity and well-being *[79,80]*.
- A structured schedule for study and breaks was discussed as crucial for preventing stress and promoting effective exam preparation *[80,23]*.

| Coverage Score | Citation Score | Joint Score |
|---|---|---|
| **50** | **51** | **22** |

FIG. 4

| Method | Cov. Corr. | Link Acc. | Cost ($) |
|---|---|---|---|
| Manual Annot. | 0.770 | 95.0 | $325 |
| Gemini-1.5-pro | **0.751** | **89.3** | $15.1 |
| GPT-4o (9FS) | 0.719 | 89.2 | $26.1 |
| <u>GPT-4o</u> | 0.716 | 88.9 | $6.9 |
| Claude 3 Opus | 0.677 | 87.9 | $23.8 |
| Claude 3 Haiku | 0.498 | 87.7 | $0.4 |
| GPT3.5 | 0.495 | 86.7 | $1.3 |

FIG. 8A

| Summarizer | Coverage Score (↑) | | | | | | | Citation Score (↑) | | | | | | |
|---|---|---|---|---|---|---|---|---|---|---|---|---|---|---|
| | Rand | Vect | LongE | KWs | RR3 | Orac | Full | Rand | Vect | LongE | KWs | RR3 | Orac | Full |
| GPT3.5 | 36.2 | 45.8 | 46.0 | 48.4 | 51.9 | 56.2 | - | 9.3 | 15.2 | 15.0 | 15.9 | 16.8 | 23.0 | - |
| Claude 3 Haiku | 49.9 | 64.9 | 62.3 | 63.4 | 66.6 | 72.1 | 62.3 | 13.4 | 25.1 | 25.5 | 26.5 | 28.8 | 35.6 | 14.1 |
| GPT4-turbo | 49.4 | 61.0 | 56.7 | 61.2 | 61.8 | 67.1 | 57.9 | 17.9 | 28.6 | 28.1 | 31.1 | 31.8 | 41.4 | 5.5 |
| Command-r | 47.0 | 54.8 | 53.5 | 56.0 | 55.2 | 60.4 | 50.3 | 17.7 | 34.6 | 34.9 | 37.5 | 40.4 | 53.8 | 30.9 |
| Gemini-1.5-flash | 49.7 | 58.1 | 58.9 | 61.8 | 62.6 | 65.1 | 59.4 | 17.4 | 31.9 | 31.8 | 34.2 | 43.6 | 51.7 | 32.8 |
| Command-r + | 44.2 | 56.4 | 53.1 | 56.2 | 58.9 | 61.0 | 44.5 | 20.4 | 41.7 | 41.7 | 43.1 | 46.8 | 60.2 | 19.9 |
| Claude 3 Sonnet | 55.8 | 70.6 | 69.7 | 72.1 | 73.1 | 77.7 | 73.6 | 18.0 | 34.9 | 36.6 | 37.3 | 41.1 | 51.7 | 23.5 |
| Claude 3 Opus | 56.5 | 72.4 | 69.6 | 72.5 | 76.5 | 81.4 | 76.2 | 17.7 | 34.3 | 35.8 | 37.3 | 39.4 | 50.7 | 22.3 |
| GPT-4o | 54.0 | 67.1 | 67.8 | 66.6 | 70.4 | 76.6 | 66.1 | 21.9 | 38.4 | 38.0 | 38.6 | 41.3 | 54.6 | 16.2 |
| Gemini-L5-pro | 53.0 | 63.5 | 64.9 | 63.6 | 68.4 | 67.6 | 70.0 | 21.9 | 43.1 | 44.5 | 46.6 | 49.7 | 64.1 | 51.0 |
| Human Perf. | - | - | - | - | - | 74.5 | - | - | - | - | - | - | 73.9 | - |

TO FIG. 8C

FIG. 8B

FROM FIG. 8B

| Summarizer | Rand | Vect | LongE | Kws | RR3 | Orac | Full | $\#W_b$ |
|---|---|---|---|---|---|---|---|---|
| | Joint Score (↑) | | | | | | | |
| GPT3.5 | 3.6 | 7.3 | 7.2 | 7.9 | 9.0 | 13.2 | - | 28.2 |
| Claude 3 Haiku | 7.1 | 17.4 | 17.2 | 17.7 | 20.1 | 26.8 | 9.2 | 31.9 |
| GPT4-turbo | 9.6 | 18.7 | 16.9 | 20.1 | 20.6 | 28.9 | 3.2 | 37.9 |
| Command-r | 8.9 | 19.6 | 19.6 | 21.9 | 23.6 | 33.9 | 16.2 | 33.1 |
| Gemini-1.5-flash | 9.2 | 19.4 | 20.0 | 22.0 | 28.7 | 34.9 | 21.0 | 31.6 |
| Command-r + | 9.6 | 24.7 | 24.0 | 25.7 | 29.3 | 38.3 | 9.7 | 25.5 |
| Claude 3 Sonnet | 11.0 | 26.1 | 27.2 | 28.5 | 31.4 | 41.2 | 18.3 | 33.5 |
| Claude 3 Opus | 11.1 | 26.5 | 26.7 | 28.6 | 31.9 | 42.5 | 18.0 | 29.3 |
| GPT-4o | 12.6 | 27.3 | 27.6 | 27.3 | 30.8 | 43.4 | 11.4 | 36.5 |
| Gemini-L5-pro | 12.3 | 28.6 | 31.0 | 30.8 | 36.0 | 44.6 | 37.8 | 30.2 |
| Human Perf. | - | - | - | - | - | 56.1 | - | 29.7 |

FIG. 8C

| | Document Order | | | |
| --- | --- | --- | --- | --- |
| Summarizer | Top | Bottom | Random | Sensitivity |
| GPT-4o | 13.8 | **24.1** | 11.4 | 12.6 |
| Claude3 Opus | 20.4 | **28.0** | 18.0 | 10.0 |
| Gemini-1.5-pro | **47.1** | 38.9 | 37.9 | 9.2 |

FIG. 8D

SYSTEMS AND METHODS FOR TRAINING AND EVALUATING LONG-CONTEXT NEURAL NETWORK BASED LANGUAGE MODELS

CROSS REFERENCE(S)

The instant application is a nonprovisional of and claim priority under 35 U.S.C. 119 to U.S. provisional application No. 63/660,489, filed Jun. 15, 2024, which is hereby expressly incorporated by reference herein in its entirety.

TECHNICAL FIELD

The embodiments relate generally to machine learning systems for content generation, and more specifically to systems and methods for training and evaluating long-context neural network based language models.

BACKGROUND

AI conversation agents, commonly known as chatbots or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI conversation agents can assist with product recommendations, order tracking, and personalized shopping experiences. In information technology (IT) support, these agents can guide users through troubleshooting steps, helping them resolve software and hardware issues. Specifically, for network hazards, AI conversation agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task.

Retrieval augmented generation (RAG) large language model (LLM) can be used for generating answers to queries based on long contexts. However, training or evaluating such long-context based RAG LLMs remains challenging due to scarcity of long-context training or testing data.

BRIEF DESCRIPTION OF THE DRAWINGS

FIG. 4 shows certain evaluation metrics for the long-context training and evaluation framework, according to some embodiments.

FIGS. 8A-8D provide charts illustrating exemplary performance of different embodiments described herein.

Figure 1:
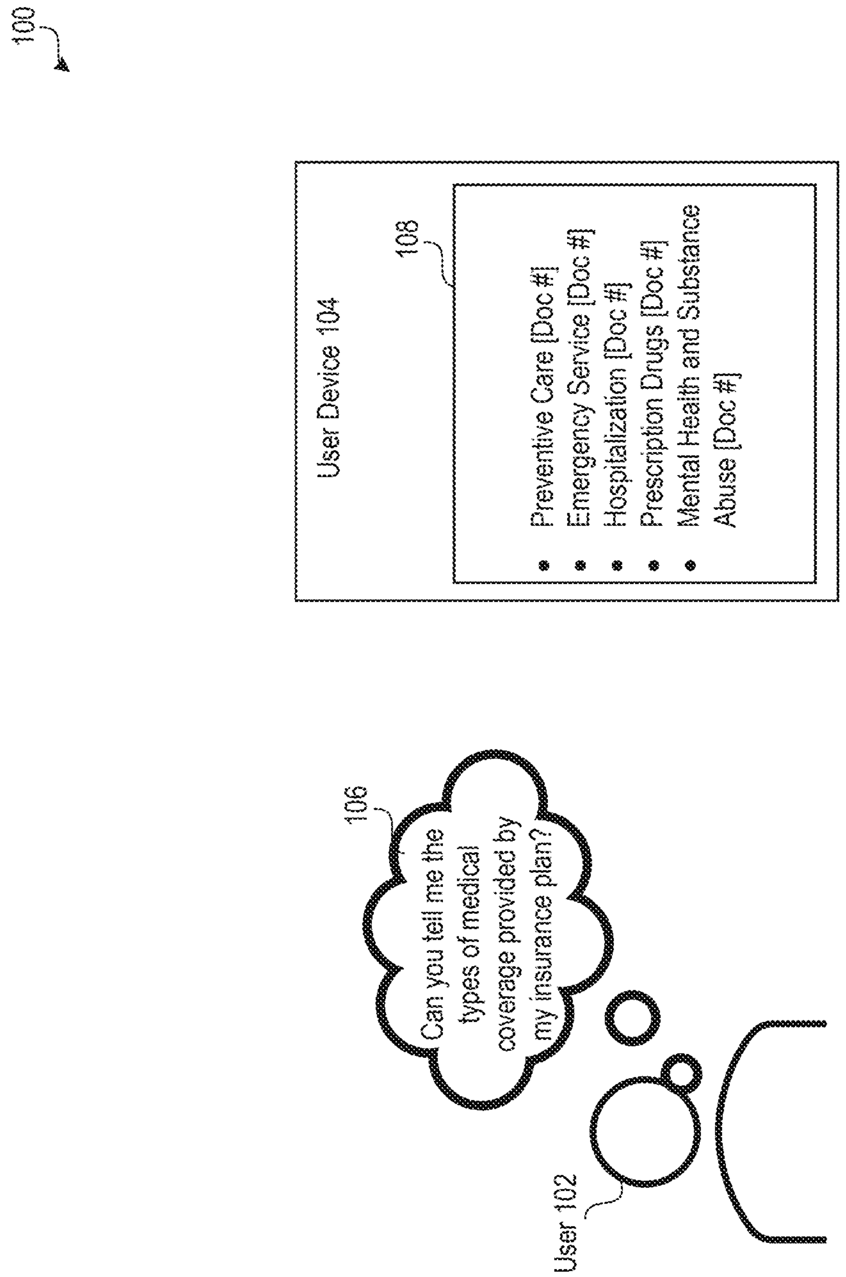
FIG. 1 shows an application of a use device with long-context generation functions, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. An LLM may comprise an architecture of mixed software and/or hardware, e.g., including an application-specific integrated circuit (ASIC) such as a Tensor Processing Unit (TPU).

Overview

Retrieval augmented generation (RAG) large language model (LLM) can be used for generating answers to queries based on long contexts. However, training or evaluating such long-context based RAG LLMs remains challenging due to scarcity of long-context training or testing data.

In view of the need for a training/evaluation dataset to train and/or evaluate a RAG LLM, embodiments described herein provide a systems and methods for a data pipeline that generates a dataset of long-context documents for training and/or evaluating RAG LLMs. For example, given a document on a particular topic, an LLM is used to generate a list of subtopics to the topic and a list of insights, which are defined as statements that contain specific information that may appear in a document about a given subtopic, for each subtopic. The LLM may then combine randomly selected insights to form a new document, resulting in a dataset of documents each containing a different combination of insights. The resulting dataset is thus used to train or evaluate the performance of a RAG LLM. For example, given a testing or training query relating to a subtopic, the RAG LLM may retrieve a relevant document from the resulting dataset, based on which to generate an answer to the query. The answer can thus be compared with a standard answer that is annotated with the dataset when documents in the dataset were generated.

Embodiments described herein provide a number of benefits. For example, the training/evaluation dataset can more effectively train a RAG LLM to generate desirable answers based on long contexts, or more effectively evaluate a RAG LLM's capability to generate desirable answers based on long contexts. A chatbot based on a RAG LLM can then generate answers with improved accuracy in response to a user's query. For example, a chatbot used in healthcare or network issue diagnosis can provide a user answers with improved accuracy. Therefore, with improved performance on RAG LLM or content generation, neural network technology in implementing AI conversation agents in different practical applications (e.g., healthcare, network diagnostics) are improved.

FIG. 1 shows an application 100 of a RAG LLM, according to embodiments of the present disclosure. A user 102 may utter a query 106 in natural language. In response, a user device 104 may output/display an answer 108 on a display interface, such as a screen. In some embodiments, answer 108 is the output of an artificial intelligence (AI) chatbot, which is built on a bot server that is communicatively connected to user device 104. The chatbot may be based on, or include, a RAG LLM. In some embodiments, the RAG LLM receives query 106 through utterance of user 102, retrieves a corpus of documents, and generate an output based on the retrieved documents. In some embodiments, the documents include long-context documents, e.g., documents that include a large number of token higher than the input length of a typical LLM.

As an example, query 106 may include a question of "Can you tell me the types of medical coverage provided by my insurance plan?" The chatbot may provide answer 108 with a summary of the types of medical coverages in a predetermined format, e.g., a bullet-point format, such that one type of medical coverage is listed behind a bullet-point. Also, a citation of document(s) that mentioned the medical coverage is provided behind the respective bullet.

The RAG LLM may be a pre-trained neural network based language model, and may be evaluated after training. In some embodiments, the training dataset and the evaluation dataset may be generated using the data pipeline, a long-context training and evaluation framework, provided by this disclosure (detailed description provided as follows). In some embodiments, user device 104 includes suitable hardware and/or software to perform functions of the chatbot. For example, user device 104 may include a processor, a memory, an input interface, and an output interface (detailed description provided as follows). In some embodiments, user device 104 includes a computer or a mobile device such as a mobile phone or a tablet.

Figure 2:
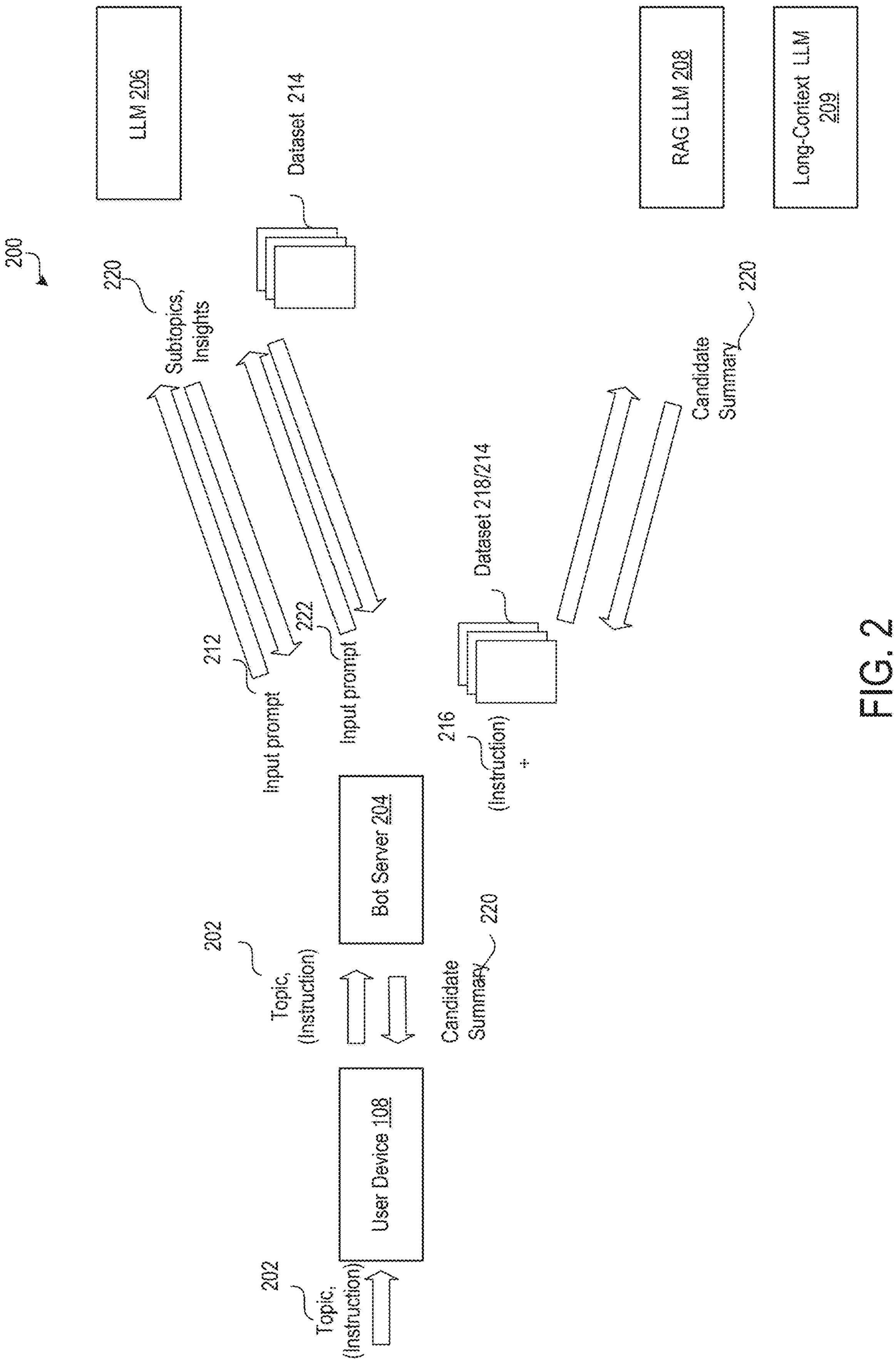
FIG. 2 is a simplified diagram illustrating a long-context training and evaluation framework, according to some embodiments.
Figure 3:
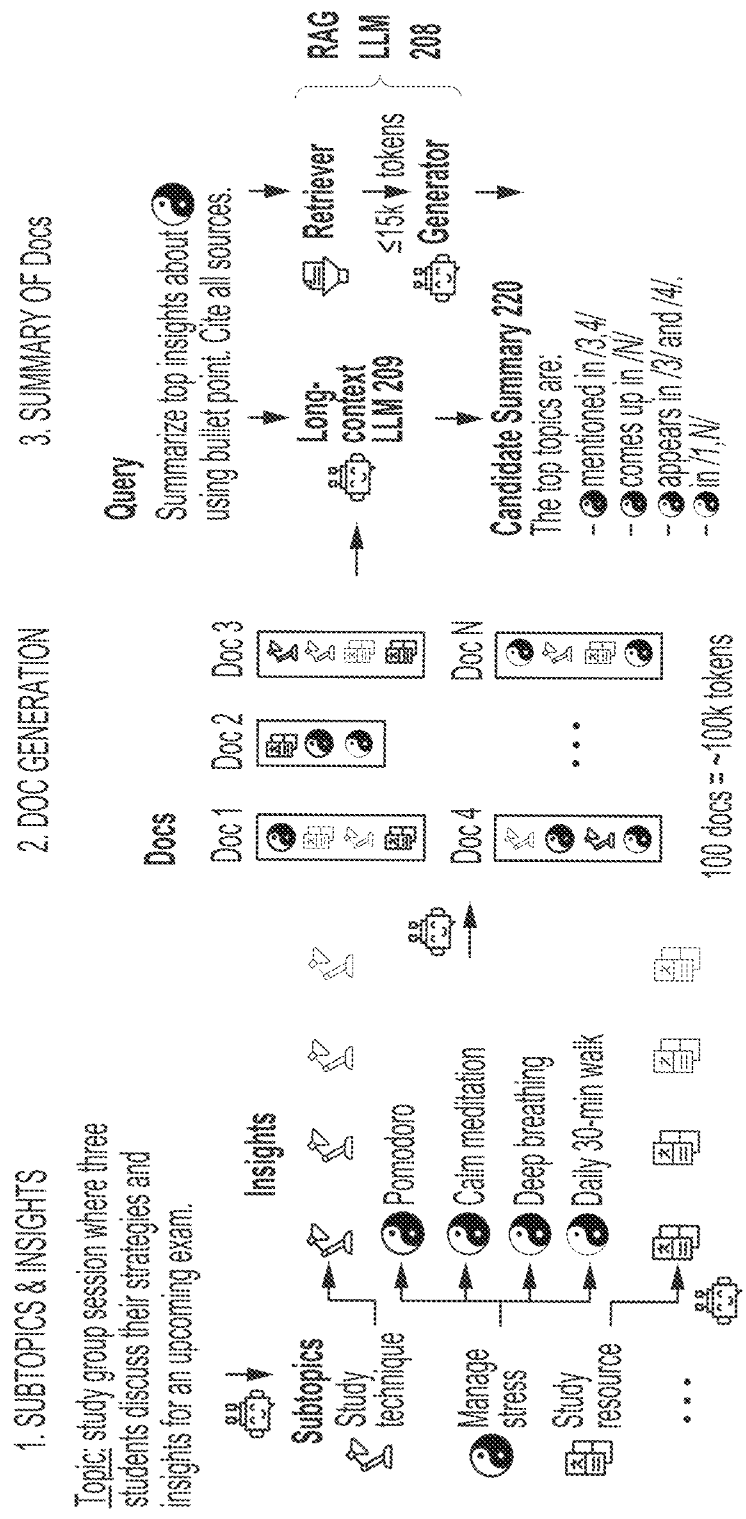
FIG. 3 shows a process to generate a training/evaluation dataset, according to some embodiments.

FIG. 2 is a simplified diagram illustrating a long-context training and evaluation framework 100 according to some embodiments. The framework 100 comprises a bot server 204 and a LLM 206. Bot server 204 may be operatively connected to a user device 108, LLM 206, and a RAG LLM 208 through respective application programming interfaces (APIs). In some embodiments, bot server 204 may include a chatbot that respond to a user query with a summary 108. Long-context training and evaluation framework 100 may be used to generate a training dataset to train RAG LLM 208, and/or an evaluation dataset to evaluate RAG LLM 208. FIG. 3 shows an exemplary process of generating a training/evaluation dataset.

User device 108 may be installed with an API, and may be communicatively connected to bot server 204 through the API. At training stage, user device 108 may receive an input 202 from a user's utterance, and may transmit input 202 to bot server 204 through the API.

To generate a training dataset, input 202 may include a topic and an instruction to cause LLM 206 to generate a training dataset with one or more documents, and train RAG LLM 208 using the training dataset. The topic may include one or more sentences in natural language. User device 108 may output the received topic and the instruction to bot server 204, which includes an API for communicatively connecting LLM 206.

Bot server 204 may receive the topic and the instruction as input, and generate an input prompt 212 as an output based on the topic and the instruction. In some embodiments, input prompt 212 causes LLM 206 to generate a predetermined number of subtopics and a predetermined number of insights corresponding to each subtopics. As an example, LLM 206 may be caused to generate 10 subtopics, each with a plurality (e.g., ranging from about 5 to about 10) of insights.

Specifically, input prompt 212 may cause LLM 206 to generate one or more subtopics based on the topic, and one or more insights corresponding to each subtopic. For example, the topic may include a sentence "study group session where three students discuss their strategies and insights for an upcoming exam." A subtopic may include generic description of the topic. For example, as shown in FIG. 3, subtopics may include "study techniques," "manage stress," "study resource," etc. In some embodiments, each subtopic is distinctive and unique, such that no two subtopics overlap thematically. In some embodiments, subtopics are expandable into at least a predetermined number of insights that are specific to the subtopic. As an example, the predetermined number is 3. An insight may include a statement that contains specific information that may appear in a document about a given subtopic. In some embodiments, an insight includes a number, a date, an entity, etc. For example, in the "managing stress" subtopic, an insight may be "a student explaining what the 25-5 Pomodoro technique is to the others."

LLM 206 may receive input prompt 212 as an input and generate an output 220 that includes a plurality of subtopics and one or more insights corresponding to each subtopic, as shown in FIG. 3. In some embodiments, the subtopics and the insights generated by LLM 206 are also referred to as reference subtopics and reference insights, respectively. LLM 206 may transmit output 220 to bot server 204 through the API. In some embodiments, LLM 206 includes a suitable neural network based language model such as GPT-3.5, GPT-4o, etc.

Upon receiving the subtopics and the insights, bot server 204 may randomly select one or more sets of insights across different subtopics. For each set of selected insights, bot server 204 may also generate an input prompt 222 that may cause LLM 206 to construct/form one or more documents to include all the insights in the set. Input prompt 222 may also include an instruction to cause LLM 206 to generate a query based on each subtopic (e.g., reference subtopic). For example, for subtopic "stress management," the instruction can cause LLM 206 to generate a query similar to "what do the students discuss regarding stress management?" In some embodiments, the number of insights to include per document varies based on the domain, such as about 750 words of content per document (or about 1000 tokens). Bot server 204 may transmit input prompt 222 to LLM 206.

Upon receiving input prompt 222 as the input, LLM 206 may generate an output that includes a dataset 214 of one or more documents and one or more queries based on input prompt 222. In some embodiments, each document in dataset 214 includes all the randomly selected insights in a corresponding set. LLM 206 may transmit dataset 214 to bot server 204 through the API.

Upon receiving dataset 214, bot server 204 may generate a dataset 218 that includes dataset 214 and one or more reference summaries generated based on the queries (e.g., subtopics). Dataset 218 may be the training dataset for RAG LLM 208. A reference summary may be in a predetermined format, e.g., a bullet-point format with a predetermined number of bullet points, where the predetermined number is equal to the number of insights (e.g., reference insights) corresponding to the respective subtopic (e.g., reference subtopic). Following each bullet point, the reference summary may include one of the insights, followed by a citation of the document(s) that mention(s) the insight. The reference summaries may serve as the ground-truth for the training of RAG LLM 208. In some embodiments, the reference summaries may be generated by bot server 204 or by human. Bot server 204 may transmit dataset 218 to RAG LLM 208 through an API.

RAG LLM 208 may receive dataset 218 as the input and generate one or more summaries based on the one or more documents and the queries. In some embodiments, RAG LLM 208 includes a retriever and a generator (as shown in FIG. 3)). The retriever may retrieve document(s) related to the insights, and the generator may generate a summary based on the retrieved document(s). RAG LLM 208 may be trained on dataset 218 based on a training objective comparing the summaries generated by RAG LLM 208 and the reference summaries. The training objective may include a loss function, e.g., a cross entropy, a minimum mean squared error (MMSE), or a combination. During the training, the parameters of RAG LLM 208 may be updated to minimize the training objective.

At evaluation stage, user device 108 may receive input 202 from a user (e.g., 102). Different from the training stage, input 202 may include a topic from the user utterance but without an instruction. In some embodiments, input 202 includes an instruction that causes bot server 204 to evaluate RAG LLM 208 (e.g., a trained RAG LLM). Receiving input 202, user device 108 may transmit it to bot server 204 through the API. Bot server 204 may generate input prompts (e.g., 212 and 222) to cause the LLM 206 to generate dataset 214, similar to those described for the training stage. Receiving dataset 214 from LLM 206, bot server 204 may generate an input prompt that includes an instruction 216 and dataset 214. Instruction 216 may cause RAG LLM 208 to generate one or more candidate summaries in the predetermined format (e.g., bullet-point format) in response to the queries in dataset 214, and cite documents that mentioned a candidate insight after a bullet.

Upon receiving instruction 216 and dataset 214, RAG LLM 208 may be caused to generate one or more candidate summaries each in a format that include a predetermined number of candidate bullet points, where the predetermined number is equal to the number of reference insights corresponding to the respective subtopic. Following each candidate bullet point, the candidate summary may include a candidate insight, followed by a candidate citation of the document(s) that mention(s) the candidate insight. RAG LLM 208 may generate one or more candidate summaries as an output 220, and transmit output 220 to bot server 204.

In some embodiments, the summaries (or candidate summaries) generation include generating, by at least one Application-Specific Integrated Circuit (ASIC) performing a multiplicative and/or accumulative operation for a neural network based language model, a next token; and generating a natural language output representing an answer to the user query combining a sequence of generated tokens.

Bot server 204 may evaluate RAG LLM 208 by evaluating the summaries generated by RAG LLM 208. Bot server 204 may evaluate the candidate summaries based on one or more evaluation metrics, such as a coverage metric, a citation metric, and a joint metric.

The coverage metric may measure the overlap between the candidate bullets (e.g., the candidate insights) and the subtopic's reference insights the insights generated by LLM 206). Bot server 108 may determine whether a reference insight is fully, partially, or not covered in any of the candidate bullet points (e.g., candidate insights). For each reference insight, bot server 108 score the candidate summary 100 for full coverage, 50 for partial coverage, and 0 otherwise. The final coverage score of a candidate summary may be the average coverage on all the insights of the candidate subtopic, such that it ranges from 0 to 100. FIG. 4 shows an example. The top reference insight is fully covered by the second candidate bullet/insight, the second reference insight is partially covered by the first candidate bullet/insight, and the third reference insight is not covered in the candidate summary. The Coverage Score is calculated as (100+50+0)/3=50.

The citation metric may measure the precision and recall between the candidate insight and the gold-standard citations, which represent the documents cited by the corresponding reference insight. For example, because documents generated by LLM 206 are synthesized, each reference insight can be traced to a gold-standard set of documents that contain the reference insight. When a candidate bullet covers a reference insight, bot server 204 may compare generated candidate citations to the gold-standard cites. For each partially or fully covered reference insight, bot server 204 may extract cited documents from the paired summary bullet point using a regular expression ([.*]), and measure the precision and recall between the candidate and gold-standard citations. The Citation Score of a reference insight is calculated as the F1 score of the precision and recall, giving equal weight to both. In some embodiments, RAG LLM 208 may be both precise and thorough in its citing to achieve a high Citation Score. The Citation Score of an entire summary is then the average insight Citation Score of all reference insights that are covered by RAG LLM 208. As shown in FIG. 4, the average Citation F1 of the two covered candidate bullets of the candidate summary is calculated as (29+73)/2=51.

The joint metric may combine the Coverage Score and the citation Score of a candidate summary together to measure whether a candidate summary both covers the expected reference insights and gold-standard citations appropriately. The Joint Score of a candidate summary is calculated by iterating over each reference insight and multiplying its coverage score and citation scores (assigning a Citation Score of 0 in case the insight is not covered). The Joint Score of a candidate summary ranges from 0 to 100. As shown in FIG. 4, the Joint Score of the candidate summary is calculated as (100×0.29+50×0.73+0×0)/3=21.8.

FIG. 8A shows the performances of different long-context LLMs after evaluation. The performances are based on correlation on the insight-level coverage scores, linking accuracy (which measures whether long-context LLMs can attribute the coverage to the correct reference bullet point), and the cost of evaluating summaries (e.g., about 200). FIG. 8A shows that GPT-4o and Gemini-1.5-pro can achieve a strong positive correction (e.g., 0.7+) with the human annotation.

In various embodiments, dataset 214 can be also used to train a long-context LLM 209 to generate summaries based on the documents in dataset 214, and dataset 218 can be used to evaluate the long-context LLM 209 based on the candidate summaries 220 generated at evaluation stage. The training and evaluation of long-context LLM 209 may be similar to those of RAG LLM 208. Details of the comparison of the summarization between long-context LLM 209 and RAG LLM 208 at the evaluation stage are described as follows.

At inference stage, user device 108 may receive input 202 from a user (e.g., 102). Input 202 may include a topic from the user utterance. Receiving the topic, user device 108 may transmit the topic to bot server 204 through the API. Bot server 204 may generate input prompts (e.g., 212 and 222) to cause the LLM 206 to generate dataset 214, similar to those described at the evaluation stage. Bot server 204 may also generate an input prompt that causes RAG LLM 208 to generate an output 220 that includes a candidate summary. Bot server 204 may transmit the candidate summary to user device 108 to be viewed by user 102 on user device 104.

In some embodiments, input 202 may include a task query that includes a query to identify an information technology (IT) anomaly relating to a usage of an IT component. The method may further include determining that the updated action execution state representing an information technology anomaly, and causing an alert relating to the information technology anomaly to be displayed at a visualized user interface.

Computer and Network Environment

Figure 5A:
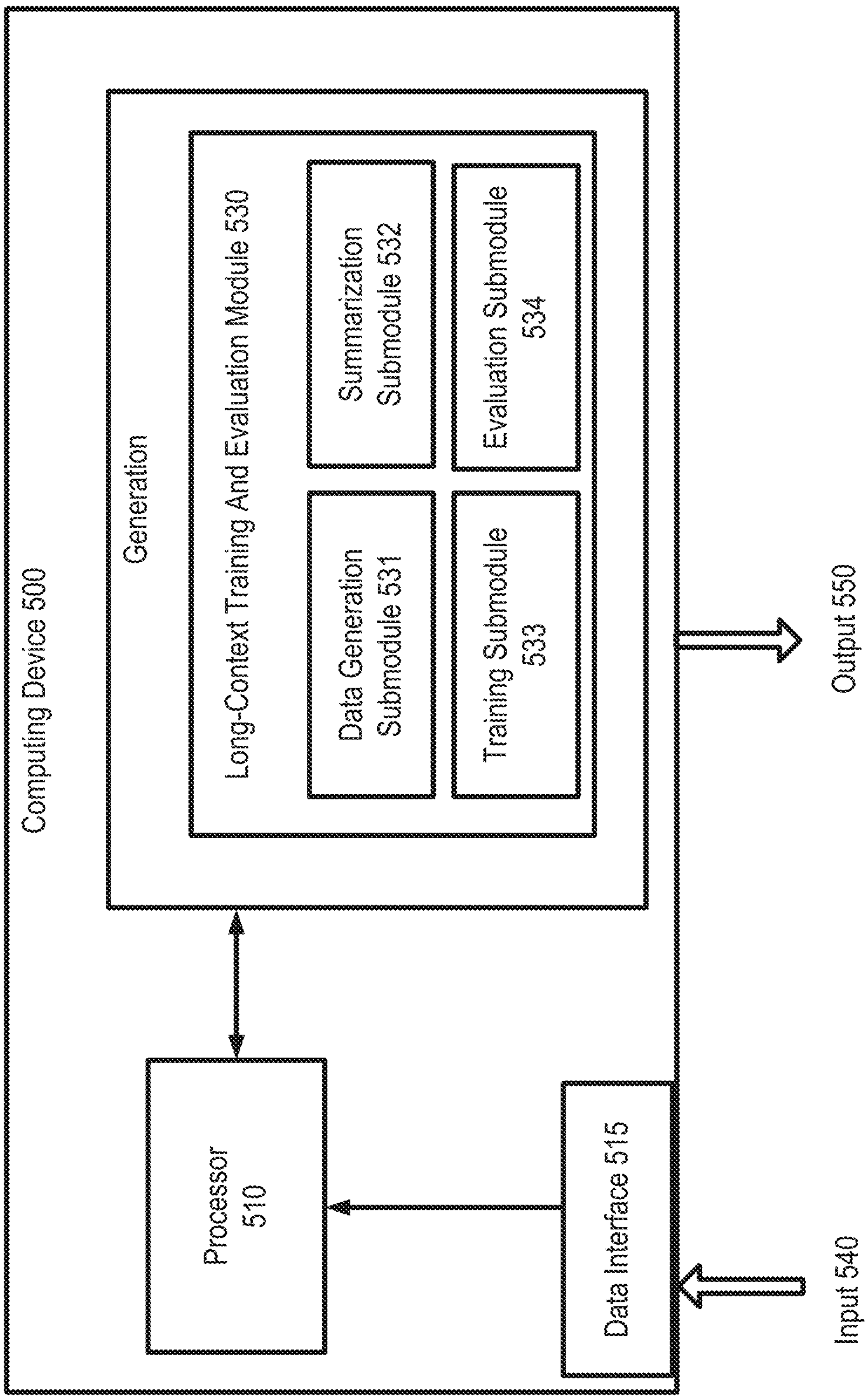
FIG. 5A is a simplified diagram illustrating a computing device implementing the long-context training and evaluation framework described in FIGS. 1-4, according to some embodiments.

FIG. 5A is a simplified diagram illustrating a computing device implementing the long-context training and evaluation framework 100 described in FIGS. 1-4, according to one embodiment described herein. As shown in FIG. 5A, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

Figure 5B:
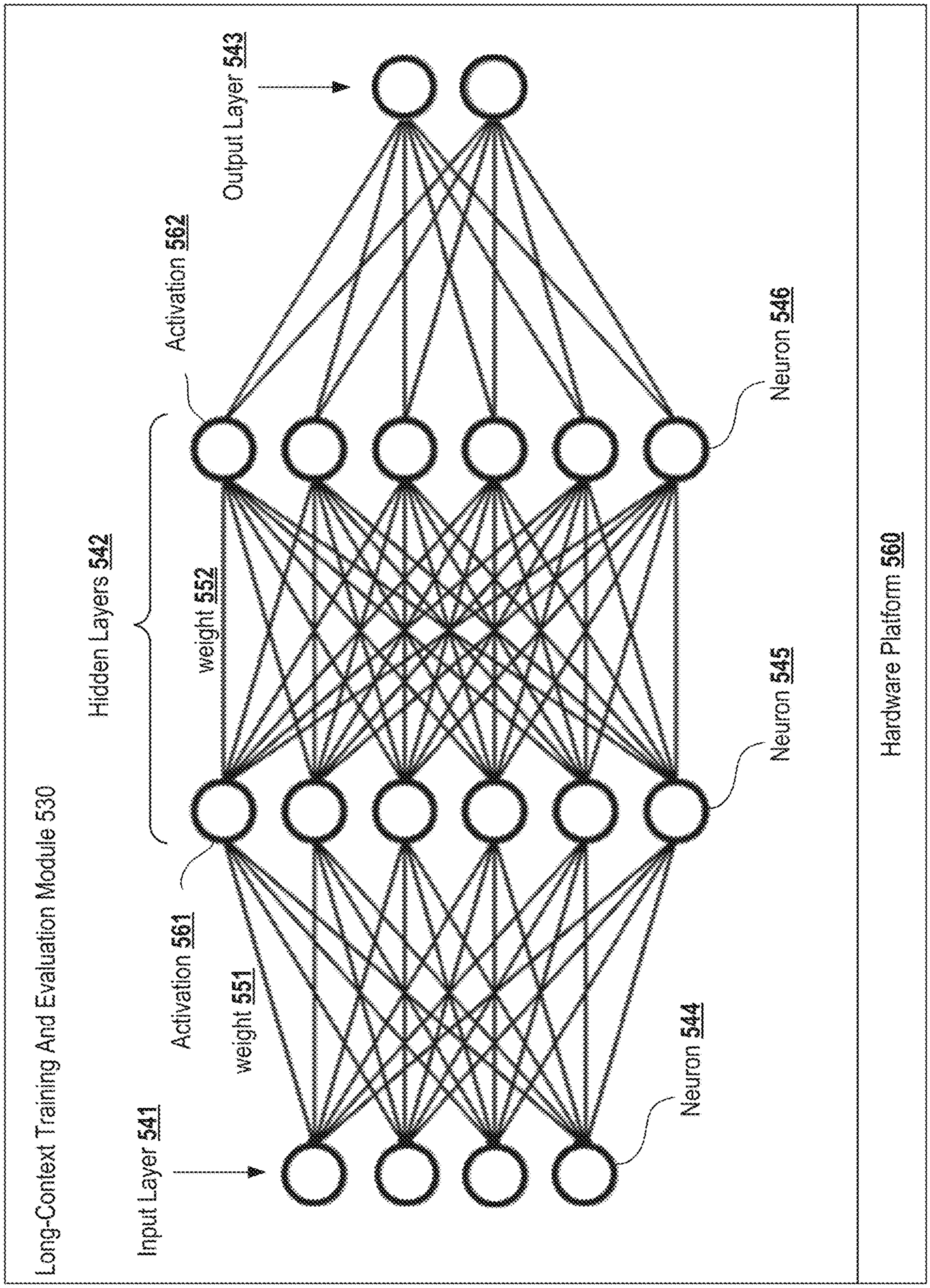
FIG. 5B is a simplified diagram illustrating a neural network structure, according to some embodiments.

In another embodiment, processor 510 may comprise multiple microprocessors and/or memory 520 may comprise multiple registers and/or other memory elements such that processor 510 and/or memory 520 may be arranged in the form of a hardware-based neural network, as further described in FIG. 5B.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for long-context training and evaluation module 530 that may be used to implement and/or emulate the systems and models, and/or to implement any of the methods described further herein. long-context training and evaluation module 530 may receive input 540 such as an input training data (e.g., dataset 218) via the data interface 515 and generate an output 550 which may be summaries conditioned on documents in dataset 218.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as input 202 that includes a user utterance of a topic, from a user via the user interface.

In some embodiments, the long-context training and evaluation module 530 is configured to generate training and evaluation datasets, use the training dataset to train a RAG LLM, and use the evaluation dataset to evaluate the RAG LLM. The long-context training and evaluation module 530 may further include a data generation submodule 531, a summarization submodule 532, a training submodule 533, and an evaluation submodule 534. Submodules 531-534 may perform similar operations as bot server 204 in FIG. 2. Data generation submodule 531 may be configured to generate input prompts (e.g., 212, 222) to cause a LLM (e.g., LLM 206) to generate a dataset (e.g., 214) used for training and evaluation of RAG LLM 208. Summarization submodule 532 may be configured to generate a training dataset (e.g., 214) and/or an evaluation dataset (e.g., 218) and cause a RAG LLM (e.g., RAG LLM 208) to generate summaries at training stage or candidate summaries at evaluation stage. Training submodule 533 may be configured to train RAG LLM 208 until the training objective is reached/minimized. Evaluation submodule 534 may be configured to evaluate the RAG LLM (e.g., 208) based on the candidate summaries generated by the RAG LLM (e.g., 220) using one or more evaluation metrics.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 5B is a simplified diagram illustrating the neural network structure implementing the long-context training and evaluation module 530 described in FIG. 5A, according to some embodiments. In some embodiments, the long-context training and evaluation module 530 and/or one or more of its submodules 531-534 may be implemented at least partially via an artificial neural network structure shown in FIG. 5B. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data (e.g., 540 in FIG. 5A), such as a topic and/or an instruction. The number of nodes (neurons) in the input layer 541 may be determined by the dimensionality of the input data (e.g., the length of a vector of a topic and/or an instruction). Each node in the input layer represents a feature or attribute of the input.

The hidden layers 542 are intermediate layers between the input and output layers of a neural network. It is noted that two hidden layers 542 are shown in FIG. 5B for illustrative purpose only, and any number of hidden layers may be utilized in a neural network structure. Hidden layers 542 may extract and transform the input data through a series of weighted computations and activation functions.

For example, as discussed in FIG. 5A, the long-context training and evaluation module 530 receives an input 540 of a topic and/or an instruction and transforms the input into an output 550 of a candidate summary. To perform the transformation, each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the long-context training and evaluation module 530 and/or one or more of its submodules 531-534 may comprise the transformative neural network structure of layers of neurons, and weights and activation functions describing the non-linear transformation at each neuron. Such a neural network structure is often implemented on one or more hardware processors 510, such as a graphics processing unit (GPU). An example neural network may be GPT-4o, GPT-3.5, Gemini, Claude, and/or the like.

In one embodiment, the long-context training and evaluation module 530 and its submodules 531-534 may comprise one or more LLMs built upon a Transformer architecture. For example, the Transformer architecture comprises multiple layers, each consisting of self-attention and feedforward neural networks. The self-attention layer transforms a set of input tokens (such as words) into different weights assigned to each token, capturing dependencies and relationships among tokens. The feedforward layers then transform the input tokens, based on the attention weights, represents a high-dimensional embedding of the tokens, capturing various linguistic features and relationships among the tokens. The self-attention and feed-forward operations are iteratively performed through multiple layers of self-attention and feedforward layers, thereby generating an output based on the context of the input tokens. One forward pass for an input tokens to be processed through the multiple layers to generate an output in a Transformer architecture often entail hundreds of teraflops (trillions of floating-point operations) of computation.

In one embodiment, the long-context training and evaluation module 530 and its submodules 531-534 may be implemented by hardware, software and/or a combination thereof. For example, the long-context training and evaluation module 530 and its submodules 531-534 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In another embodiment, some or all of layers 541, 542, 543 and/or neurons 542, 545, 546, and operations there between such as activations 561, 562, and/or the like, of the long-context training and evaluation module 530 and its submodules 531-534 may be realized via one or more ASICs. For example, each neuron 542, 545 and 546 may be a hardware ASIC comprising a register, a microprocessor, and/or an input/output interface. For another example, operations among the neurons and layers may be implemented through an ASIC TPU. For yet another example, some operations among the neurons and layers such as a softmax operation, an activation function (such as a rectified linear unit (ReLU), sigmoid linear unit (SiLU), and/or the like) may be implemented by one or more ASICS.

For example, the long-context training and evaluation module 530 may generate, by at least one ASIC (such as a TPU, etc.) performing a multiplicative and/or accumulative operation for a neural network based language model, a next token based at least in prat on previously generated tokens, and in turn generate a natural language output representing the next-step action combining a sequence of generated tokens.

In one embodiment, the neural network based long-context training and evaluation module 530 and one or more of its submodules 531-534 may be trained by iteratively updating the underlying parameters (e.g., weights 551, 552, etc., bias parameters and/or coefficients in the activation functions 561, 562 associated with neurons) of the neural network based on the loss. For example, during forward propagation, the training data such as dataset 214 are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 is compared to the expected output (e.g., a "ground-truth" such as the corresponding reference summaries) from the training data, to compute a loss function that measures the discrepancy between the predicted output and the expected output. For example, the loss function may be cross entropy, MMSE, or a combination. Given the loss, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

In one embodiment, the neural network based long-context training and evaluation module 530 and one or more of its submodules 531-534 may be trained using policy gradient methods, also referred to as "reinforcement learning" methods. For example, instead of computing a loss based on a training output generated via a forward propagation of training data, the "policy" of the neural network model, which is a mapping from an input of the current states or observations of an environment the neural network model is operated at, to an output of action. Specifically, at each time step, a reward is allocated to an output of action generated by the neural network model. The gradients of the expected cumulative reward with respect to the neural network parameters are estimated based on the output of action, the current states of observations of the environment, and/or the like. These gradients guide the update of the policy parameters using gradient descent methods like stochastic gradient descent (SGD) or Adam. In this way, as the "policy" parameters of the neural network model may be iteratively updated while generating an output action as time progresses, the boundaries between training and inference are often less distinct compared to supervised learning—in other words, backward propagation and forward propagation may occur for both "training" and "inference" stages of the neural network mode.

In one embodiment, long-context training and evaluation module 530 and its submodules 531-534 may be housed at a centralized server (e.g., computing device 500) or one or more distributed servers. For example, one or more of long-context training and evaluation module 530 and its submodules 531-534 may be housed at external server(s). The different modules may be communicatively coupled by building one or more connections through application programming interfaces (APIs) for each respective module. Additional network environment for the distributed servers hosting different modules and/or submodules may be discussed in FIG. 6.

During a backward pass, parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating a summary in response a user query (e.g., including a topic).

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

In some implementations, to improve the computational efficiency of training a neural network model, "training" a neural network model such as an LLM may sometimes be carried out by updating the input prompt, e.g., the instruction to teach an LLM how to perform a certain task. For example, while the parameters of the LLM may be frozen, a set of tunable prompt parameters and/or embeddings that are usually appended to an input to the LLM may be updated based on a training loss during a backward pass. For another example, instead of tuning any parameter during a backward pass, input prompts, instructions, or input formats may be updated to influence their output or behavior. Such prompt designs may range from simple keyword prompts to more sophisticated templates or examples tailored to specific tasks or domains.

In general, the training and/or finetuning of an LLM can be computationally extensive. For example, GPT-3 has 175 billion parameters, and a single forward pass using an input of a short sequence can involve hundreds of teraflops (trillions of floating-point operations) of computation. Training such a model requires immense computational resources, including powerful GPUs or TPUs and significant memory capacity. Additionally, during training, multiple forward and backward passes through the network are performed for each batch of data (e.g., thousands of training samples), further adding to the computational load.

In general, the training process transforms the neural network into an "updated" trained neural network with updated parameters such as weights, activation functions, and biases. The trained neural network thus improves neural network technology in content generation, as well as chatbot applications in fields like healthcare and network issue diagnosis.

Figure 6:
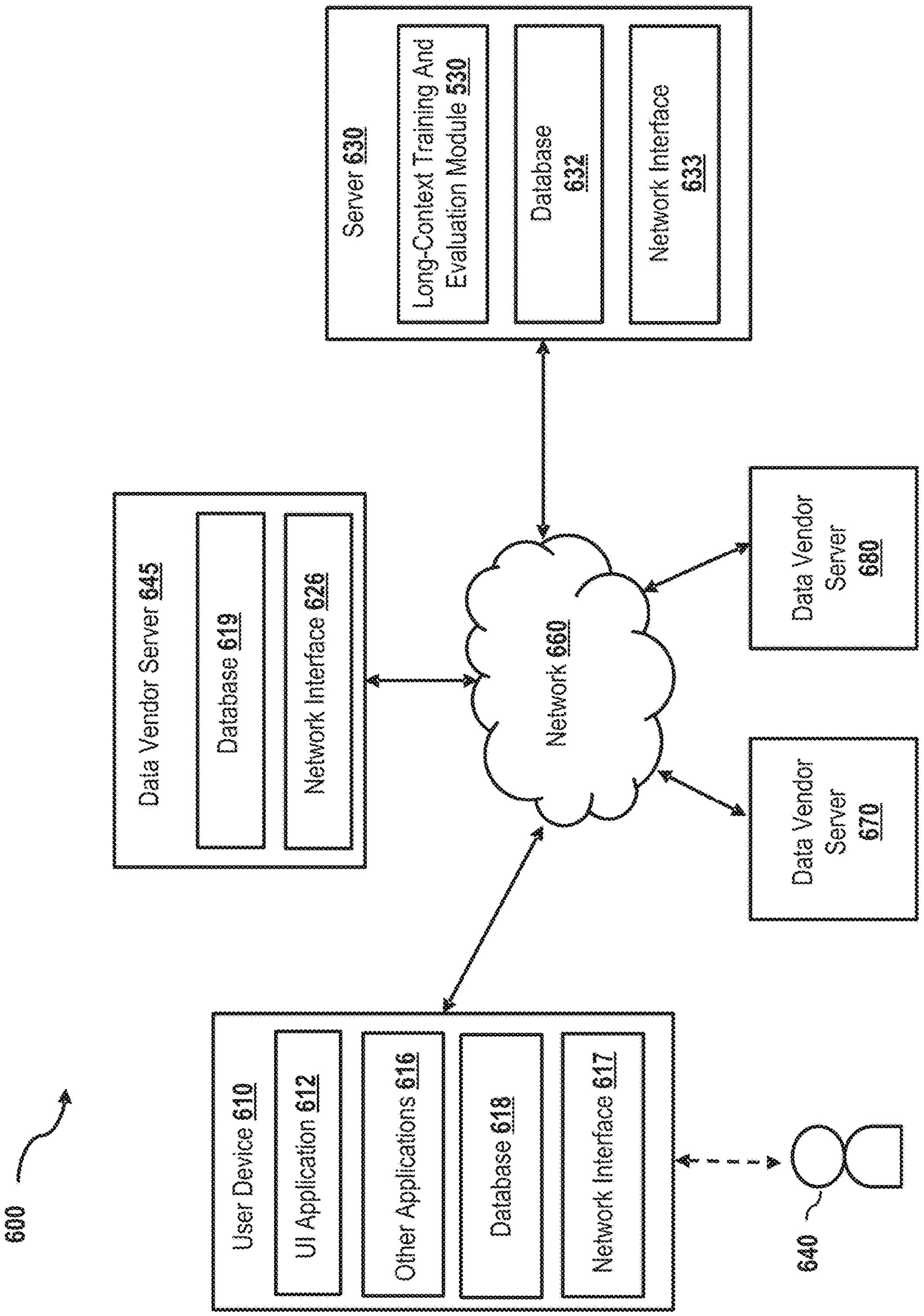
FIG. 6 is a simplified block diagram of a networked system suitable for implementing the long-context training and evaluation framework described in FIGS. 1-4 and other embodiments described herein.

FIG. 6 is a simplified block diagram of a networked system 600 suitable for implementing the long-context training and evaluation framework 100 described in FIGS. 1-4, 5A, and 5B and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5A, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating a training status, a evaluation result, and/or an answer to a user query from the server 630 and display the message via the UI application 612. In other embodiments, user device 610 may include additional or different modules having specialized hardware and/or software as required.

In one embodiment, UI application 612 may communicatively and interactively generate a UI for an AI agent implemented through the long-context training and evaluation module 530 (e.g., an LLM agent) at server 630. In at least one embodiment, a user operating user device 610 may enter a user utterance, e.g., via text or audio input, such as a question, uploading a document, and/or the like via the UI application 612. Such user utterance may be sent to server 630, at which long-context training and evaluation module 530 may generate a response via the process described in FIG. 2. The long-context training and evaluation module 530 may thus cause a display of summary (or candidate summary) at UI application 612 and interactively update the display in real time with the user utterance.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view a training status, an evaluation result, and/or an answer in response to a user query.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including dataset 214 to the server 630. The database 619 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the long-context training and evaluation module 530 and its submodules described in FIG. 5A. In some implementations, long-context training and evaluation module 530 may receive data from database 619 at the data vendor server 645 via the network 660 to generate candidate summaries. The generated candidate summaries may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the long-context training and evaluation module 530. In one implementation, the database 632 may store previously generated training data (e.g., dataset 214), evaluation data (e.g., dataset 218), candidate summaries (e.g., 220), and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

Figure 7:
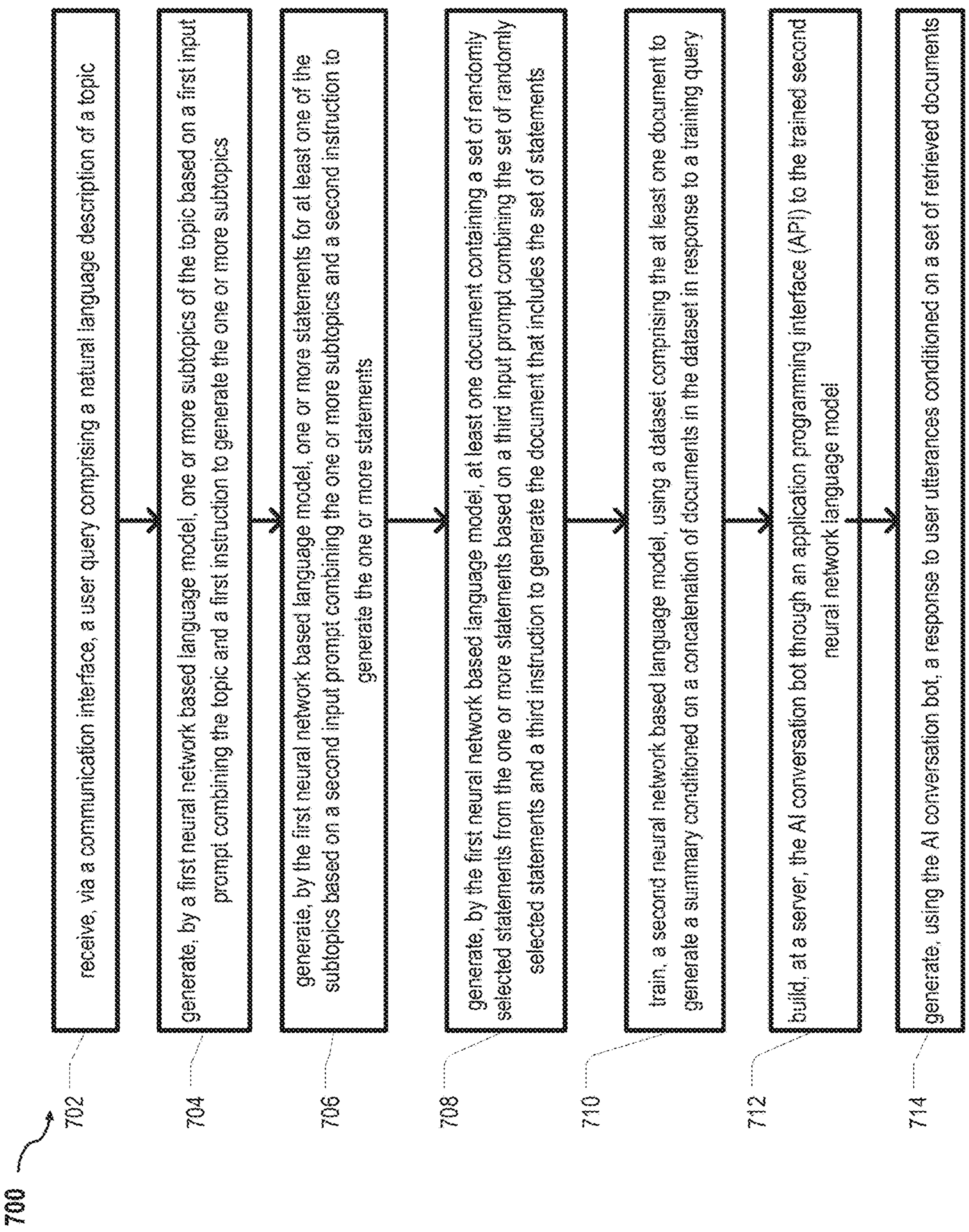
FIG. 7 is an example logic flow diagram illustrating a method of training a RAG LLM based on the framework shown in FIGS. 1-4, according to some embodiments.

FIG. 7 is an example logic flow diagram illustrating a method of long-context training and evaluation based on the framework shown in FIGS. 1-4, 5A, 5B, and 6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the long-context training and evaluation module 530 (e.g., FIGS. 5A and 6) that performs training/evaluation dataset generation, and training/evaluation of RAG LLMs.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 702, a user query including a natural language description of a topic is received via a communication interface.

At step 704, one or more subtopics of the topic based on a first input prompt combining the topic and a first instruction to generate the one or more subtopics, are generated by a first neural network based language model.

At step 706, one or more statements for at least one of the subtopics based on a second input prompt combining the one or more subtopics and a second instruction to generate the one or more statements, are generated by the first neural network based language model.

At step 706, at least one document containing a set of randomly selected statements is generated by the first neural network based language model, from the one or more statements based on a third input prompt combining the set of randomly selected statements and a third instruction to generate the document that includes the set of statements.

In some embodiments, the generating of the at least one document containing the set of randomly selected states includes selecting the set of randomly selected statements corresponding to a plurality of different subtopics from the one or more subtopics.

At step 708, a second neural network based language model is trained using a dataset having the at least one document to generate a summary conditioned on a concatenation of documents in the dataset in response to a training query.

At step 710, the AI conversation bot is built, at a server, through an application programming interface (API) to the trained second neural network based language model.

At step 712, a response to user utterances conditioned on a set of retrieved documents is generated using the AI conversation bot.

In some embodiments, method 700 further includes, generating, by the first neural network based language model, the training query from one of the one or more subtopics. In some embodiments, the training of the second neural network based language model using the dataset includes: generating the summary in a bullet-point format, a number of the bullet points representing a number of statements corresponding to a subtopic corresponding to the training query. In some embodiments, the generating of the summary further includes citing a document corresponding to at least one of the statements at a corresponding bullet point. In some embodiments, the training of the second neural network based language model further comprises comparing the summary and a reference summary based on a training objective.

In some embodiments, method 700 further includes evaluating the response based on at least one or more of a coverage metric, a citation metric, and a joint metric. In some embodiments, the coverage metric is computed based on an average of coverage scores of statements corresponding to an evaluation subtopic; the citation metric is computed based on an average of citation scores of the statements corresponding to the evaluation subtopic; and the joint metric is computed as a sum of the coverage score multiplying a respective citation score.

In one embodiment, method 700 is applicable in a variety of applications. For example, the task request received by a neural network model (e.g., use query that contains a topic) may relate to a diagnostic request in view of a medical record in a healthcare system, a curriculum designing request in an online education system, a code generation request in a software development system, a writing and/or editing request in a content generation system, an IT diagnostic request in an IT customer service support system, a navigation request in a robotic and autonomous system, and/or the like. By performing method 700, the neural network based artificial agent may improve technology in the respective technical field in healthcare and diagnostics, education and personalized learning, software development and code assistance, content creation, autonomous system (such as autonomous driving, etc.), and/or the like.

For example, when the task query includes a query to identify an information technology (IT) anomaly relating to a usage of an IT component such as a network gateway, a router, an online printer, and/or the like, by performing method 700 at an environment of a local area network (LAN), the neural network based artificial agent may receive an observation from the environment at which the next-step action is executed, and determine that the observation representing an information technology anomaly (e.g., a router failure, an unauthorized access attempt, a domain name system anomaly, and/or the like). In some implementations, the neural network based artificial agent may cause an alert relating to the information technology anomaly to be displayed at a visualized user interface. In this way, IT anomalies may be detected and alerted using the neural network based artificial agent in an efficient manner so as to improve network support technology.

Example Results

FIGS. 8A-8D represent exemplary test results using embodiments described herein. As illustrated in FIG. 3 (right), both long-context LLM that directly accesses the full documents in dataset 218 and RAG LLM 208 where a retriever filters the documents in dataset 214 (or 218) down to documents it perceives as relevant, which get passed to a generator (LLM), are evaluated. By default, documents in dataset 214 are ordered in a single arbitrary order.

Full-context summarization by a LLM is evaluated. A range of recent LLMs with context lengths longer than an individual dataset 218 are tested. The LLMs include Cohere's Command-R and Command-R+, Google's Gemini-1.5-pro and Gemini-1.5-flash (Machel Reid, Nikolay Savinov, Denis Teplyashin, Dmitry Lepikhin, Timothy Lillicrap, Jean-baptiste Alayrac, Radu Soricut, Angeliki Lazaridou, Orhan Fi-rat, Julian Schrittwieser, et al., "Gemini 1.5: Unlocking multimodal understanding across millions of tokens of context," 2024), OpenAI's GPT4-turbo and GPT-4o, and An-thropic's Claude3 models (haiku, sonnet, and opus). GPT-3.5 is also included exclusively in the RAG setting, as its context length is 16 k tokens.

Retrieval-augmented summarization by a RAG LLM is evaluated. RAG systems such as RAG LLM 208, to reduce the document input size are evaluated. All retrieval models receive the query and all documents in dataset 218 and may produce a query relevance score for each document. The documents are sorted in reverse order according to the query relevance score and select the first 15 k worth of document tokens. About 15 k chosen document tokens enable us to experiment with generators that have a 16 k context window (GPT-3.5-turbo). A total of six retrievers were experimented with, each implemented as a separate query relevance score function. Under KWs, the document score is the number of overlapping keywords, extracted by NLTK, between the document and the subtopic query. Embedding methods that compute the cosine similarity between each document and the subtopic query were compared, Vect, a SentenceTransformers (Nils Reimers and Iryna Gurevych, "Sentence-bert: Sentence embeddings using siamese bert-networks," In *Proceedings of the* 2019 *Conference on Empirical Methods in Natural Language Processing*. Association for Computational Linguistics, 2019) embedder and LongE (Dawei Zhu, Liang Wang, Nan Yang, Yifan Song, Wen-hao Wu, Furu Wei, and Sujian Li, "Longembed: Extending embedding models for long context retrieval," 2024), which extends standard embedders to cover longer input contexts, and include the Rerank3 (RR3) model from Cohere (Cohere Inc. 2024, "Introducing rerank 3: The next generation of search relevance," Accessed: 2024 Jun. 10). A Rand baseline that randomly assigns relevance scores, and an oracle setting ranker Orac were also included. The score of ranker Orac is the number of subtopic insights that appear in a given document. The last two provide lower- and upper-bound retrieval quality estimates.

FIGS. 8B and 8C summarizes the experimental results of summarization using the documents generated by the long-text training and evaluation framework 100 across long-context, in the Full column, and RAG settings for all 10 Summarizers included in the study.

Coverage scores—which measure the presence of expected insights in a system's output summary—range from 36.2% when using a random retriever and GPT3.5-turbo as the summarizer, to 81.4% using the Oracle retriever with the Claude 3 Opus summarizer. The choice of retriever impacts the Coverage score, with Random and Oracle retrievers leading to the best and worst scores, respectively, for almost all summarizers. Yet, top-performing LLMs like Claude3-opus achieve strong Coverage scores (70%+) under most retrieval settings, including Full context. In other words, achieving strong coverage of key insights in a large corpus of text does not require retrieval, given a sufficiently capable long-context LLM.

Citation scores—which account for both the precision and the thoroughness of the model's attribution back to source documents—present a complementary narrative. The lowest citation score often occurs in the full-context setting, with citation quality on par with random retrieval. On the other hand, as retrieval improves (for example from Random to RR3 to Oracle), citation scores increase. In a nutshell, for use-cases where citation quality is important, optimizing retrieval is paramount: it removes irrelevant documents from the summarizer's context, narrowing and focusing options for citation. Gemini-1.5-pro stands out as an outlier, as it is the only model that achieves comparable Citation scores in RAG and long-context settings.

Taking Coverage and Citation into account, the Joint Score provides the complete system performance on the summarization based on dataset 218. As expected, all Summarizers perform best with the Oracle retriever, an unrealistic setting intended to evaluate score ranges.

All models except for Gemini-1.5-pro achieve their realistic best performance in the RAG setting using the RR3 retriever. The higher relative performance of the more advanced RAG retriever RR3, developed for enterprise search and RAG settings, aligns with expectations compared to simpler retrievers. This result confirms the validity of summarization based on dataset 218 as a test-bed for holistic RAG evaluation; newer, more advanced RAGs can be benchmarked in an end-to-end fashion on summarization based on dataset 218, measuring direct impact on output quality.

Two large gaps were observed: all RAG systems underperform the Oracle setting, indicating ample room for improvements in RAG systems, and models achieve very low Joint scores in the full-context setting (10-20), indicating that summarization based on dataset 218 is an unsolved task for long-context LLMs. Gemini-1.5-pro stands with strong ability to cite in the full-context setting, achieving the only realistic score above 35 on the benchmark.

In the Rerank3 RAG setting, the top three models are neck and neck, with Claude3 Opus, GPT-4o, and Gemini-1.5-pro all achieving Joint Scores between 30.8 and 36.0. Yet these models achieve these performances through different trade-offs, with Claude3 Opus obtaining the highest Coverage, Gemini-1.5-pro the highest Citation, and GPT-4o at the mid-point. This confirms there is room to grow: a system that achieves the coverage of Claude3 Opus with the citation quality of Gemini-1.5-pro can exceed current score by 15-20%.

The right-most column of FIGS. 8B and 8C shows each system's average bullet point length (number of tokens). Several systems (Gemini-1.5-pro and Claude 3 Opus) average 30 words per bullet, close human-written bullet points (29.7). Others (GPT-4o, GPT4-turbo) are more verbose, at 36-38 words per bullet point. It is confirmed that verbosity does not bias evaluation: succinct methods can achieve strong performance on dataset 218.

Citation Scores may be broken down into Precision and Recall. No system excels at either precision or recall but trade-offs are observed. For example, Claude models generally achieve higher precision and lower recall, whereas Command-r+ and GPT-4o favor recall over precision.

Position Bias Sensitivity was investigated. In the Full Context experiment results in FIGS. 8B and 8C, documents in the Haystack are ordered arbitrarily, with relevant documents in the top, middle, and bottom portions of the context window. Prior work (Kung-Hsiang Huang, Philippe Laban, Alexander R Fabbri, Prafulla Kumar Choubey, Shafiq Joty, Caiming Xiong, and Chien-Sheng Wu, "Embrace divergence for richer insights: A multi-document summarization benchmark and a case study on summarizing diverse information from news articles," 2023; Yapei Chang, Kyle Lo, Tanya Goyal, and Mohit lyyer, "Booookscore: A systematic exploration of book-length summarization in the era of llms," 2023; Hung-Ting Chen, Fangyuan Xu, Shane A Arora, and Eunsol Choi, "Understanding retrieval augmentation for long-form question answering," 2023; Mathieu Ravaut, Shafiq Joty, Aixin Sun, and Nancy F Chen, "On context utilization in summarization with large language models," 2023) has reported that models exhibit a position bias that leads them to put more importance on information in the context window's extremities. Dataset 218 offers a framework to study position bias systematically. In FIG. 8D, the results of the Position Bias experiment is reported, in which dataset 218 is experimented with the top-3 performing models on sorted documents in dataset 218, where relevant documents to a subtopic are either all at the top or bottom of the context window. Similar to prior work, it is found that all three models exhibit position bias, with GPT-4o and Claude3 Opus performing better when relevant documents are at the bottom of the context window, and Gemini-1.5-pro favoring top documents. A Position Sensitivity score is computed as the maximum absolute difference in Joint Score between the random ordering and top and bottom conditions. Future systems should strive to attain minimal sensitivity on summarization based on dataset 218, as document ordering is often arbitrary in real-world applications.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of configuring an artificial intelligence (AI) conversation bot to respond to a user query based on retrieved contextual documents, comprising:

receiving, via a communication interface, a user query comprising a natural language description of a topic;

generating, by a first neural network based language model, one or more subtopics of the topic based on a first input prompt combining the topic and a first instruction to generate the one or more subtopics;

generating, by the first neural network based language model, one or more statements for at least one of the subtopics based on a second input prompt combining the one or more subtopics and a second instruction to generate the one or more statements;

generating, by the first neural network based language model, at least one document containing a set of randomly selected statements from the one or more statements based on a third input prompt combining the set of randomly selected statements and a third instruction to generate the document that includes the set of randomly selected statements;

training, a second neural network based language model, using a dataset comprising the at least one document to generate a summary conditioned on a concatenation of documents in the dataset in response to a training query;

building, at a server, the AI conversation bot through an application programming interface (API) to the trained second neural network based language model; and generating, using the AI conversation bot, a response to user utterances conditioned on a set of retrieved documents.

2. The method of claim 1, wherein the generating of the at least one document containing the set of randomly selected states comprises selecting the set of randomly selected statements corresponding to a plurality of different subtopics from the one or more subtopics.

3. The method of claim 1, further comprising, generating, by the first neural network based language model, the training query from one of the one or more subtopics.

4. The method of claim 3, wherein the training of the second neural network based language model using the dataset comprises:

generating the summary in a bullet-point format comprising a number of the bullet points representing a number of statements corresponding to a subtopic corresponding to the training query.

5. The method of claim 4, wherein the generating of the summary further comprises citing a document corresponding to at least one of the statements at a corresponding bullet point.

6. The method of claim 3, wherein the training of the second neural network based language model further comprises comparing the summary and a reference summary based on a training objective.

7. The method of claim 1, further comprising evaluating the response based on at least one or more of a coverage metric, a citation metric, and a joint metric.

8. The method of claim 7, wherein:

the coverage metric is computed based on an average of coverage scores of statements corresponding to an evaluation subtopic;

the citation metric is computed based on an average of citation scores of the statements corresponding to the evaluation subtopic; and the joint metric is computed as a sum of the coverage score multiplying a respective citation score.

9. A system for configuring an artificial intelligence (AI) conversation bot to respond to a user query based on retrieved contextual documents, the system comprising:

a memory that stores a plurality of processor executable instructions;

a communication interface that receives a user query comprising a natural language description of a topic; and one or more hardware processors that read and execute the plurality of processor executable instructions from the memory to perform operations comprising:

generating, by a first neural network based language model, one or more subtopics of the topic based on a first input prompt combining the topic and a first instruction to generate the one or more subtopics;

generating, by the first neural network based language model, one or more statements for at least one of the subtopics based on a second input prompt combining the one or more subtopics and a second instruction to generate the one or more statements;

generating, by the first neural network based language model, at least one document containing a set of randomly selected statements from the one or more statements based on a third input prompt combining the set of randomly selected statements and a third instruction to generate the document that includes the set of randomly selected statements;

training, a second neural network based language model, using a dataset comprising the at least one document to generate a summary conditioned on a concatenation of documents in the dataset in response to a training query;

building, at a server, the AI conversation bot through an application programming interface (API) to the trained second neural network based language model; and generating, using the AI conversation bot, a response to user utterances conditioned on a set of retrieved documents.

10. The system of claim 9, wherein the processor executable instructions for generating of the at least one document containing the set of randomly selected states comprises a first processor executable instruction for selecting the set of randomly selected statements corresponding to a plurality of different subtopics from the one or more subtopics.

11. The system of claim 9, wherein the processor executable instructions further include a second processor executable instruction for generating, by the first neural network based language model, the training query from one of the one or more subtopics.

12. The system of claim 11, wherein the processor executable instructions for the training of the second neural network based language model using the dataset includes a third processor executable instruction for generating the summary in a bullet-point format having a number of the bullet points representing a number of statements corresponding to a subtopic corresponding to the training query.

13. The system of claim 12, wherein the processor executable instructions for generating of the summary further includes a fourth processor executable instruction for citing a document corresponding to at least one of the statements at a corresponding bullet point.

14. The system of claim 11, wherein the processor executable instructions for training of the second neural network based language model further includes a fifth processor executable instruction for comparing the summary and a reference summary based on a training objective.

15. The system of claim 9, wherein the processor executable instructions further include evaluating the response based on at least one or more of a coverage metric, a citation metric, and a joint metric.

16. The system of claim 15, wherein:

the coverage metric is computed based on an average of coverage scores of statements corresponding to an evaluation subtopic;

the citation metric is computed based on an average of citation scores of the statements corresponding to the evaluation subtopic; and the joint metric is computed as a sum of the coverage score multiplying a respective citation score.

17. A non-transitory machine-readable medium comprising a plurality of machine-executable instructions which, when executed by one or more processors, are adapted to cause the one or more processors to perform operations comprising:

receiving, via a communication interface, a user query comprising a natural language description of a topic;

generating, by a first neural network based language model, one or more subtopics of the topic based on a first input prompt combining the topic and a first instruction to generate the one or more subtopics;

generating, by the first neural network based language model, one or more statements for at least one of the subtopics based on a second input prompt combining the one or more subtopics and a second instruction to generate the one or more statements;

generating, by the first neural network based language model, at least one document containing a set of randomly selected statements from the one or more statements based on a third input prompt combining the set of randomly selected statements and a third instruction to generate the document that includes the set of randomly selected statements;

training, a second neural network based language model, using a dataset comprising the at least one document to generate a summary conditioned on a concatenation of documents in the dataset in response to a training query;

building, at a server, the AI conversation bot through an application programming interface (API) to the trained second neural network based language model; and generating, using the AI conversation bot, a response to user utterances conditioned on a set of retrieved documents.

18. The non-transitory machine-readable medium of claim 17, wherein generating of the at least one document containing the set of randomly selected states comprises selecting the set of randomly selected statements corresponding to a plurality of different subtopics from the one or more subtopics.

19. The non-transitory machine-readable medium of claim 17, further comprising, generating, by the first neural network based language model, the training query from one of the one or more subtopics.

20. The non-transitory machine-readable medium of claim 19, wherein the training of the second neural network based language model using the dataset comprises:

generating the summary in a bullet-point format having a number of the bullet points representing a number of statements corresponding to a subtopic corresponding to the training query.

* * * * *